(12) United States Patent
Chu et al.

(10) Patent No.: US 8,118,496 B2
(45) Date of Patent: Feb. 21, 2012

(54) HDMI OPTICAL TRANSCEIVER

(75) Inventors: Ann-Kuo Chu, Kaohsiung (TW);
Fang-Jeng Lin, Taipei (TW)

(73) Assignee: Universal Microelectronics Co., Ltd., Taichung (TW)

( * ) Notice: Subject to any disclaimer, the term of this patent is extended or adjusted under 35 U.S.C. 154(b) by 415 days.

(21) Appl. No.: 12/549,002

(22) Filed: Aug. 27, 2009

(65) Prior Publication Data

US 2011/0052202 A1 Mar. 3, 2011

(51) Int. Cl.
*G02B 6/36* (2006.01)
*H04B 10/00* (2006.01)
*G09G 5/00* (2006.01)
*H04J 14/00* (2006.01)

(52) U.S. Cl. ............. 385/88; 385/147; 398/67; 398/135

(58) Field of Classification Search ............. 385/15, 385/88–90, 139, 147; 398/67, 135, 98, 99, 398/100, 141, 183; 345/204, 2.1, 1.1
See application file for complete search history.

(56) References Cited

U.S. PATENT DOCUMENTS

| | | | |
|---|---|---|---|
| 2005/0180700 A1* | 8/2005 | Farr | 385/89 |
| 2009/0154935 A1* | 6/2009 | Deliwala | 398/139 |
| 2009/0202244 A1* | 8/2009 | Jin et al. | 398/67 |
| 2009/0232505 A1* | 9/2009 | Degan et al. | 398/101 |
| 2010/0284699 A1* | 11/2010 | Deliwala | 398/139 |

* cited by examiner

*Primary Examiner* — Akm Ullah
(74) *Attorney, Agent, or Firm* — Muncy, Geissler, Olds & Lowe, PLLC

(57) ABSTRACT

An HDMI optical transceiver comprises an optical bench, at least one light emitter disposed on the optical bench, at least one first fiber assembly, at least one photodetector disposed on the optical bench and at least one second fiber assembly. The optical bench has a surface, at least one first groove recessed from the surface and at least one second groove recessed from the surface. The light emitter has a light-emitting surface. The first fiber assembly is disposed at the first groove of the optical bench and comprises a first sleeve fixed at the first groove and a first optical fiber which is disposed in the first sleeve and aligned with the light-emitting surface. The photodetector has a light-receiving surface. The second fiber assembly is disposed at the second groove of the optical bench and comprises a second sleeve fixed at the second groove and a second optical fiber which is disposed in the second sleeve and aligned with the light-receiving surface.

13 Claims, 2 Drawing Sheets

HDMI OPTICAL TRANSCEIVER

FIELD OF THE INVENTION

The present invention is generally relating to an optical transceiver, more particularly to an HDMI (High Definition Multimedia Interface) optical transceiver, which applies sleeve to raise alignment height of optical fiber.

BACKGROUND OF THE INVENTION

It is well known in the art of optical communication to form a V-shaped groove on optical bench so as to position optical fiber when optical fiber-to-light emitter alignment or optical fiber-to-photodetector alignment is executed for HDMI (High Definition Multimedia Interface) optical transceiver. However, central location of optical fiber positioned at the V-shaped groove usually approaches surface of optical bench but lower than light-emitting location of light emitter and light-receiving location of photodetector when light emitter and photodetector are disposed on the surface of optical bench, which cannot obtain precise alignment. In general, it further forms an alignment slot on optical bench to dispose light emitter and photodetector so as to solve the problem mentioned above, light-emitting position of light emitter and light-receiving position of photodetector are appropriately adjusted to be in precise alignment with optical fiber through controlling depth of alignment slot. Nevertheless, to form V-shaped groove and alignment slot with different geometry and depth on optical bench results in not only complicated manufacturing process but also high manufacturing cost.

SUMMARY

A primary object of the present invention is to provide an HDMI (High Definition Multimedia Interface) optical transceiver comprising an optical bench, at least one light emitter disposed on the optical bench, at least one first fiber assembly, at least one photodetector disposed on the optical bench and at least one second fiber assembly. The optical bench has a surface, at least one first groove recessed from the surface and at least one second groove recessed from the surface. The light emitter has a light-emitting surface and the photodetector has a light-receiving surface. The first fiber assembly is disposed at the first groove of the optical bench comprising a first sleeve fixed at the first groove and a first optical fiber which is disposed at the first sleeve and aligned with the light-emitting surface. The second fiber assembly is disposed at the second groove of the optical bench comprising a second sleeve fixed at the second groove and a second optical fiber which is disposed at the second sleeve and aligned with the light-receiving surface. The present invention utilizes the first and second sleeves respectively to raise alignment height of the first and second optical fibers, which can be beneficial in terms of simplifying structure of the optical bench and manufacturing process, as well as enhancing optical fiber-aligning precision and lowering manufacturing cost.

DETAILED DESCRIPTION OF THE INVENTION

Figure 1:
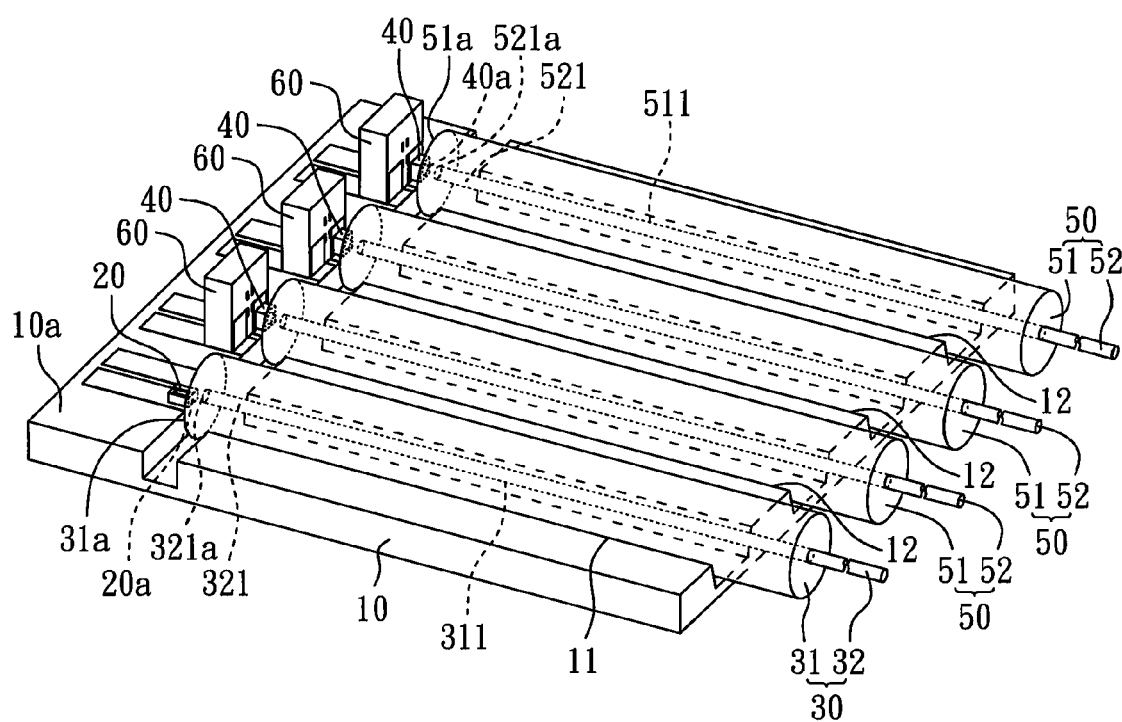
FIG. 1 illustrates structure of an HDMI optical transceiver in accordance with a preferred embodiment of the present invention.
Figure 2:
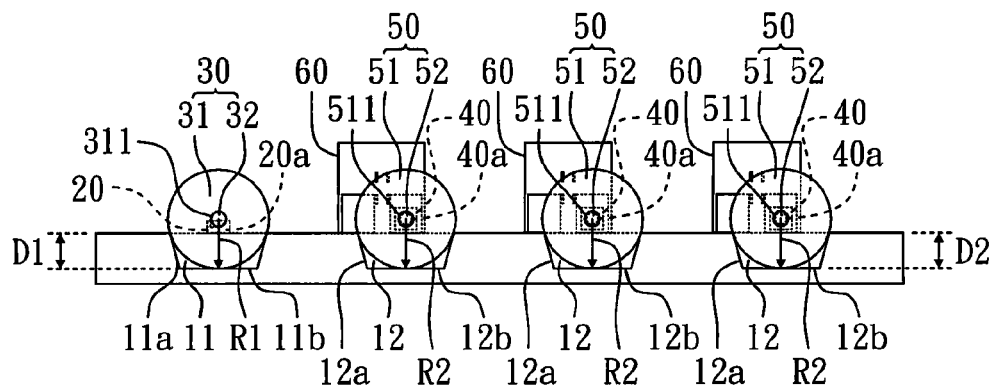
FIG. 2 is a right view of the HDMI optical transceiver.
Figure 3:
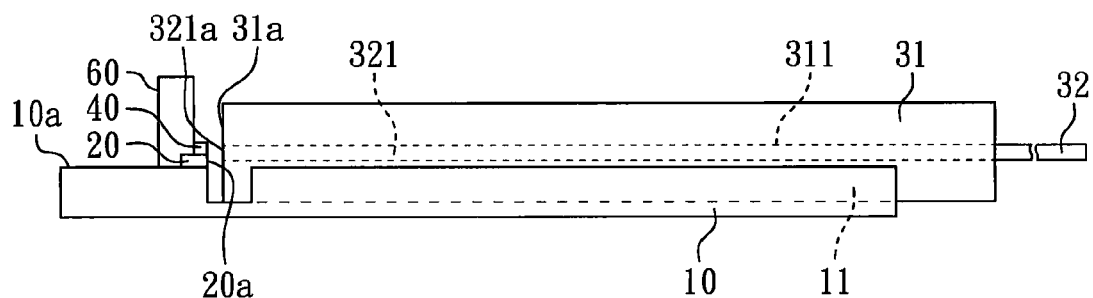
FIG. 3 is a rear view of the HDMI optical transceiver.

With reference to FIGS. 1 and 2, an HDMI optical transceiver in accordance with a preferred embodiment of the present invention comprises an optical bench 10, at least one light emitter 20 disposed on the optical bench 10, at least one first fiber assembly 30, at least one photodetector 40 disposed on the optical bench 10 and at least one second fiber assembly 50. The optical bench 10 has a surface 10a, at least one first groove 11 recessed from the surface 10a and at least one second groove 12 recessed from the surface 10a. The first groove 11 has a first wall 11a, a first bottom 11b and a first depth D1, and the second groove 12 has a second wall 12a, a second bottom 12b and a second depth D2. With reference to FIGS. 1, 2 and 3, the light emitter 20 is fixed on the surface 10a of the optical bench 10 and has a light-emitting surface 20a. The first fiber assembly 30 is disposed at the first groove 11 of the optical bench 10 comprising a first sleeve 31 fixed at the first groove 11 and a first optical fiber 32. The first sleeve 31, which contacts against the first wall 11a and the first bottom 11b of the first groove 11, has a first end surface 31a facing the light emitter 20, a first hollow portion 311 and a first radius R1, the first radius R1 of the first sleeve 31 is preferably greater than the first depth D1 of the first groove 11. The first optical fiber 32 has a first end portion 321 which is disposed within the first hollow portion 311 the first sleeve 31 and aligned with the light-emitting surface 20a of the light emitter 20. Besides, the first end portion 321 of the first optical fiber 32 has a first end plane 321a located within the first hollow portion 311 of the first sleeve 31, preferably the first end plane 321a is even with the first end surface 31a of the first sleeve 31. In addition, the first optical fiber 32 may adopt multimode optical fiber to enhance optical coupling efficiency between the light emitter 20 and the first optical fiber 32 in this embodiment.

Figure 4:
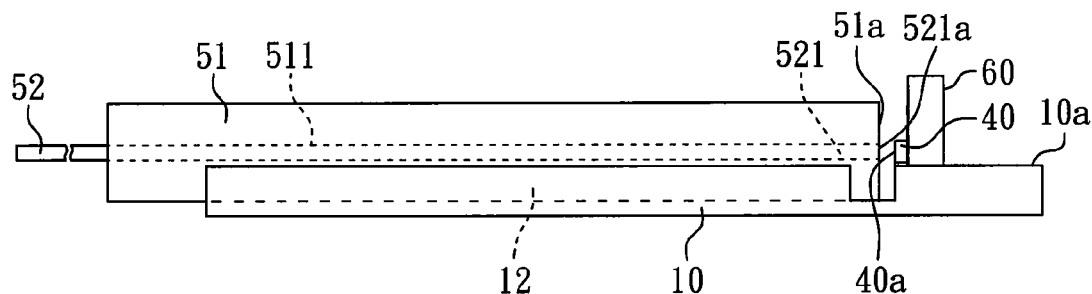
FIG. 4 is a front view of the HDMI optical transceiver.

With reference to FIGS. 1, 2 and 4, the HDMI optical transceiver further comprises an electrical adaptor 60 fixed on the surface 10a of the optical bench 10. The photodetector 40 is fixed on the electrical adaptor 60 and has a light-receiving surface 40a. The second fiber assembly 50 is disposed at the second groove 12 of the optical bench 10 comprising a second sleeve 51 fixed at the second groove 12 and a second optical fiber 52. The second sleeve 51 contacts against the second wall 12a and the second bottom 12b of the second groove 12 and has a second end surface 51a facing the photodetector 40, a second hollow portion 511 and a second radius R2, the second radius R2 of the second sleeve 51 is preferably greater than the second depth D2 of the second groove 12. The second optical fiber 52 has a second end portion 521 which is disposed within the second hollow portion 511 of the second sleeve 51 and aligned with the light-receiving surface 40a of the photodetector 40. Besides, the second end portion 521 of the second optical fiber 52 has a second end plane 521a located within the second hollow portion 511 of the second sleeve 51, preferably the second end plane 521a is even with the second end surface 51a of the second sleeve 51. In addition, the second optical fiber 52 may also adopt multimode optical fiber in this embodiment.

The present invention utilizes the first and second sleeves 31, 51 respectively to raise alignment height of the first and second optical fibers 32, 52, as well as makes the first and second optical fibers 32, 52 respectively be in precise alignment with the light emitter 20 and the photodetector 40, which can be beneficial in terms of simplifying structure of the optical bench 10 and manufacturing process, as well as enhancing optical fiber-aligning precision and lowering manufacturing cost.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. An HDMI optical transceiver comprising:
   an optical bench having a surface, at least one first groove recessed from the surface and at least one second groove recessed from the surface;
   at least one light emitter disposed on the optical bench having a light-emitting surface;
   at least one first fiber assembly disposed at the first groove of the optical bench comprising a first sleeve fixed at the first groove and a first optical fiber, wherein the first sleeve has a first hollow portion, the first optical fiber has a first end portion which is disposed within the first hollow portion of the first sleeve and aligned with the light-emitting surface of the light emitter;
   at least one photodetector disposed on the optical bench having a light-receiving surface; and
   at least one second fiber assembly disposed at the second groove of the optical bench comprising a second sleeve fixed at the second groove and a second optical fiber, wherein the second sleeve has a second hollow portion, the second optical fiber has a second end portion which is disposed within the second hollow portion of the second sleeve and aligned with the light-receiving surface of the photodetector.

2. The HDMI optical transceiver in accordance with claim 1, wherein the first groove and the second groove respectively have a first wall and a second wall, the first sleeve and the second sleeve respectively contact against the first wall and the second wall.

3. The HDMI optical transceiver in accordance with claim 1, wherein the first groove and the second groove respectively have a first bottom and a second bottom, the first sleeve and the second sleeve respectively contact against the first bottom and the second bottom.

4. The HDMI optical transceiver in accordance with claim 1, wherein the first sleeve has a first radius, the first groove has a first depth, the first radius of the first sleeve is greater than the first depth of the first groove.

5. The HDMI optical transceiver in accordance with claim 4, wherein the second sleeve has a second radius, the second groove has a second depth, the second radius of the second sleeve is greater than the second depth of the second groove.

6. The HDMI optical transceiver in accordance with claim 1, wherein the first sleeve has a first end surface facing the light emitter, the first end portion of the first optical fiber has a first end plane, the first end plane is located within the first hollow portion of the first sleeve.

7. The HDMI optical transceiver in accordance with claim 6, wherein the first end plane is even with the first end surface of the first sleeve.

8. The HDMI optical transceiver in accordance with claim 6, wherein the second sleeve has a second end surface facing the photodetector, the second end portion of the second optical fiber has a second end plane, the second end plane is located within the second hollow portion of the second sleeve.

9. The HDMI optical transceiver in accordance with claim 8, wherein the second end plane is even with the second end surface of the second sleeve.

10. The HDMI optical transceiver in accordance with claim 1, wherein the first optical fiber is multimode optical fiber.

11. The HDMI optical transceiver in accordance with claim 1, wherein the second optical fiber is multimode optical fiber.

12. The HDMI optical transceiver in accordance with claim 1, further comprising an electrical adaptor fixed on the surface of the optical bench, the photodetector is fixed on the electrical adaptor.

13. The HDMI optical transceiver in accordance with claim 1, wherein the light emitter is fixed on the surface of the optical bench.

* * * * *